United States Patent
Tsai et al.

(10) Patent No.: US 6,405,149 B1
(45) Date of Patent: Jun. 11, 2002

(54) SYSTEM AND METHOD FOR TESTING A TELECOMMUNICATION SYSTEM

(76) Inventors: Louis K. Tsai, 13356 Lafayette Way, Thornton, CO (US) 80241; Ying-li Wu, 1416 Begonia Way, Superior, CO (US) 80027

( * ) Notice: Subject to any disclaimer, the term of this patent is extended or adjusted under 35 U.S.C. 154(b) by 0 days.

(21) Appl. No.: 09/338,747

(22) Filed: Jun. 23, 1999

(51) Int. Cl.[7] .............................................. G01R 27/28
(52) U.S. Cl. ........................ 702/119; 345/508; 379/1; 379/6; 379/15; 702/62; 702/122; 710/105
(58) Field of Search .......................... 702/62, 119, 122; 379/1, 6, 15; 345/508; 710/105

(56) References Cited

U.S. PATENT DOCUMENTS

| 5,572,570 A | 11/1996 | Kuenzig |
| 5,633,909 A | 5/1997 | Fitch |
| 5,797,123 A | 8/1998 | Chou et al. |
| 5,822,397 A | 10/1998 | Newman |
| 5,825,855 A | 10/1998 | Astarabadi |
| 5,835,565 A | 11/1998 | Smith et al. |
| 5,870,627 A | 12/1998 | Gould et al. |
| 5,961,620 A | * 10/1999 | Trent et al. .................. 710/105 |
| 6,100,906 A | * 8/2000 | Asaro et al. ................. 345/508 |
| 6,161,148 A | * 12/2000 | Pratt et al. .................. 709/315 |

* cited by examiner

*Primary Examiner*—Arthur T. Grimley
*Assistant Examiner*—John Le
(74) *Attorney, Agent, or Firm*—Townsend and Townsend and Crew, LLP

(57) ABSTRACT

A system and method for testing a telecommunication system, such as a voice messaging system (VMS) are provided. The system includes a processor for controlling the execution of test script commands used to direct testing of the telecommunication system, and a storage device is provided in communication with the processor for storing the test script commands. A directory in communication with the processor includes at least one service testing application associated with the telecommunication system and developed as a dynamic linked library (DLL). Contained within the service testing application are executable functions associated with the test script commands. A command engine in communication with the processor, storage device, and directory is operable to read the test script commands, scan the directory for the associated executable functions, and execute the associated executable functions. The system further includes a telecommunication interface in communication with the processor and the telecommunication system for generating test signals for receipt by the telecommunication system based on the test script commands and the associated executable functions.

17 Claims, 2 Drawing Sheets

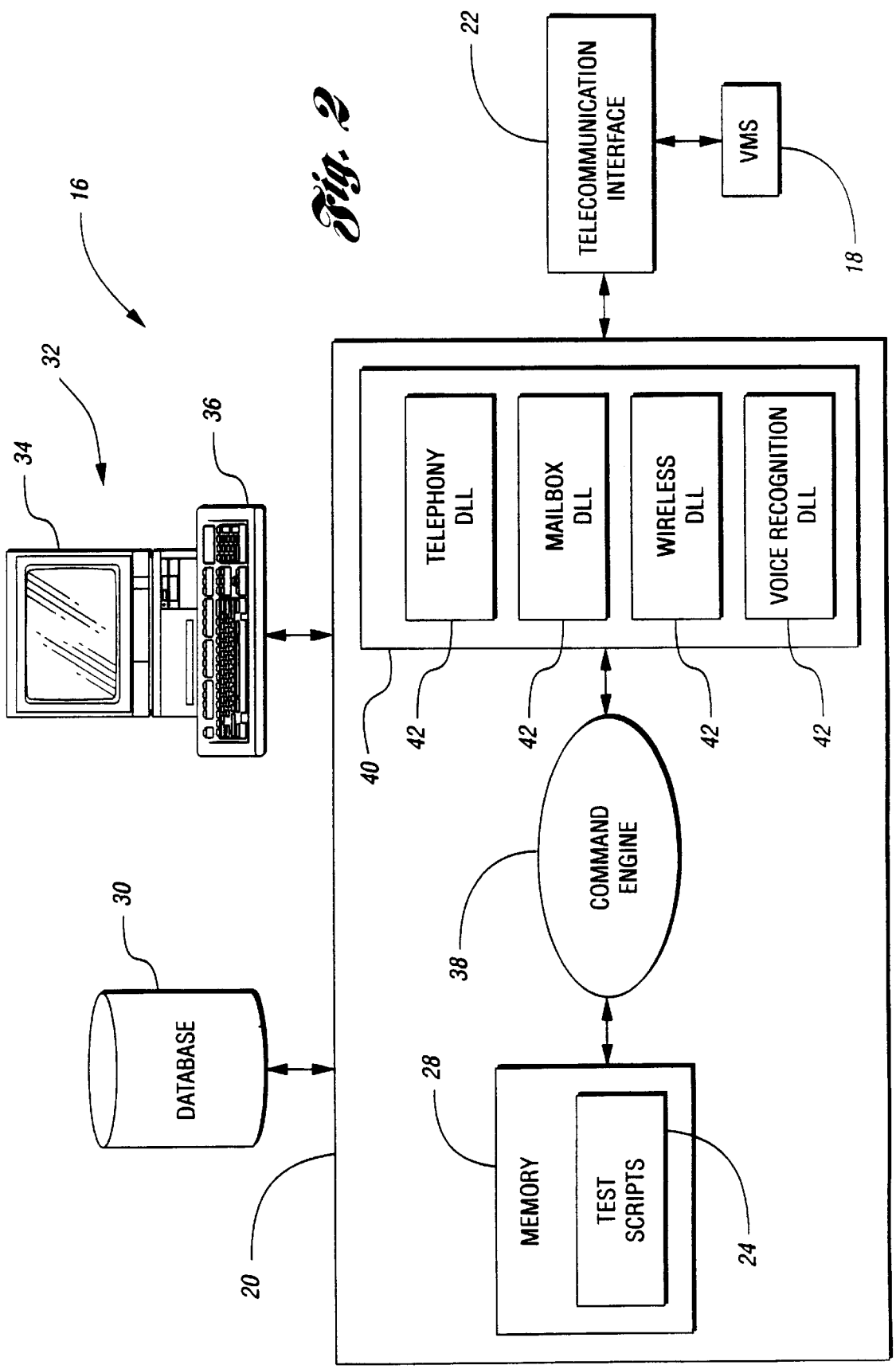

SYSTEM AND METHOD FOR TESTING A TELECOMMUNICATION SYSTEM

TECHNICAL FIELD

This invention relates to a system and method for testing the operation of telecommunications systems, in particular a voice messaging system (VMS).

BACKGROUND ART

Testing of telecommunication systems involves evaluating the connections and signal quality of the system as well as the performance of services provided by the system. In particular, many telecommunication systems provide a voice messaging system (VMS) or other systems which must be tested to ensure that they are functioning properly.

In order to test a VMS, a testing system must provide all the inputs expected by the VMS, as well as monitor and recognize all the possible responses of the VMS. Often times, test scripts are developed to accomplish VMS testing, where test scripts are files defining commands and test parameters for interacting with the VMS. Test scripts can include commands for generating test signals to the VMS, in the form of both voice signals and non-voice signals, that would be used by a caller to interact with and navigate through the VMS. Test scripts can also contain commands for recording responses of the VMS, such as voice prompts to the caller.

Within the testing system, test script commands often need to be added in order to properly test different services within the VMS. For example, in order to test a feature of an existing VMS service, the addition of test script commands may be necessitated. Alternatively, a new VMS service may have been added that requires a new set of test script commands altogether. Before the additional test script commands can be implemented, however, the executable module, or command engine, of the testing system must be modified and then recompiled. This process is time-consuming, and prohibits easy updating of the testing process.

DISCLOSURE OF INVENTION

Therefore, it is an object of the present invention to provide a system and method of testing a telecommunication system which improve the maintenance of existing service testing and permits the addition of new service testing.

It is a further object of the present invention to provide a system and method of testing a telecommunication system which allow for the addition of test script commands without having to modify and recompile the command engine.

Accordingly, a method is provided for testing a telecommunication system, such as a voice messaging system (VMS). First, the method includes reading a test script command. The method further includes scanning a directory for an executable function associated with the test script command, wherein the executable function is contained within a service testing application associated with the telecommunication and developed as a dynamic linked library (DLL). Still further, the method further includes executing the associated executable function in order to generate a test signal for receipt by the telecommunication system.

In a preferred embodiment, the method further comprises scanning the directory for a syntax checking function associated with the test script command, and passing a test parameter from the test script command to the syntax checking function operable to check the syntax of the test parameter. In addition, the method preferably includes detecting a response signal produced by the telecommunication system and evaluating the response signal to assess the operation of the telecommunication system.

Correspondingly, a system for testing a telecommunication system is provided. The system includes a processor or other suitable means for controlling the execution of test script commands used to direct testing of the telecommunication system, and a storage device is provided in communication with the processor for storing the test script commands. A directory in communication with the processor includes at least one service testing application associated with the telecommunication system and developed as a dynamic linked library (DLL). Contained within the service testing application are executable functions associated with the test script commands. A command engine in communication with the processor, storage device, and directory is operable to read the test script commands, scan the directory for the associated executable functions, and execute the associated executable functions. The system further includes a telecommunication interface in communication with the processor and the telecommunication system for generating test signals to the telecommunication system based on the test script commands and the associated executable functions.

Preferably, the storage device is further operable to store test parameters for the test script commands. Furthermore, the service testing application preferably includes syntax checking functions in addition to the executable functions, where the syntax checking functions are operable to check the syntax of the test parameters. In a preferred embodiment, the telecommunication interface is further operable to detect a response signal produced by the telecommunication system, and the processor is further operable to evaluate the response signal.

The above objects and other objects, features, and advantages of the present invention are more readily understood from a review of the attached drawings and the accompanying specification and claims.

BRIEF DESCRIPTION OF DRAWINGS

FIG. 2 is a schematic representation of the system of the present invention.

BEST MODE FOR CARRYING OUT THE INVENTION

The present invention provides a system and method for testing the operation of a telecommunication system, such as a voice messaging system (VMS). In overview, the testing system and method of the present invention improve the maintenance of existing services and support the addition of new services within a telecommunication system by moving syntax checking and executable functions associated with each test script command from the command engine into a dynamic link library (DLL). With this configuration, new test script commands can be implemented simply by modifying an existing DLL or adding a new DLL, without having to modify and recompile the command engine. Functions can be arranged into different service testing applications, where each service testing application is deployed as a different DLL.

Figure 1:
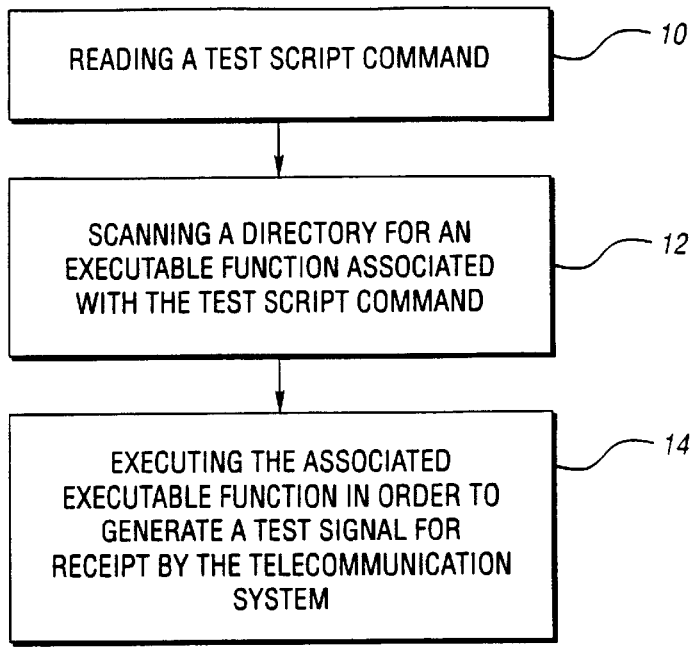
FIG. 1 is a block diagram flow chart outlining the method of testing a telecommunication system of the present invention.

FIG. 1 shows a block diagram of a testing method in accordance with the present invention. Referring to block 10, the method includes reading a test script command. Next, the method includes scanning a directory for an executable function associated with the test script command, as shown in block 12, wherein the executable function is contained within a service testing application associated with the telecommunication system and developed as a DLL. As shown in block 14, the method further includes executing the associated executable function in order to generate a test signal for receipt by the telecommunication system.

A testing system provided to carry out the above method is shown in FIG. 2 and designated generally by reference numeral 16. Testing system 16 interacts with a telecommunication system, such as a VMS 18, to test its operation. Testing system 16 includes a processor 20 or other suitable means to control the execution of test script commands used to direct testing of VMS 18. For example, the test scripts can include commands to dial a telephone number to establish communication with VMS 18, communicate information to VMS 18 in the form of voice and non-voice test signals, and detect response signals from VMS 18.

As shown in FIG. 2, processor 20 communicates with VMS 18 via a telecommunication interface 22, preferably a telephony interface circuit board (TICB). An example of a suitable TICB is Model No. D16/ESC manufactured by Dialogic Corp. (Parsipanny, N.J.). Telecommunication interface 22 is capable of generating test signals in the form of voice signals and non-voice signals, such as DTMF signals, to elicit responses from VMS 18. Telecommunication interface 22 is also capable of receiving and recording response signals from VMS 18. Telecommunication interface 22 can be connected directly to a local user switch (not shown) or VMS 18 by any connection supported by the switch or VMS 18. Alternatively, telecommunication interface 22 can be connected to VMS 18 via a switched telephone network (not shown) by an analog line, digital line, or other suitable connection. Although a connection to only one VMS 18 is shown in FIG. 2, testing system 16 preferably includes multiple channels for connecting to multiple VMSs in parallel.

Figure 3:
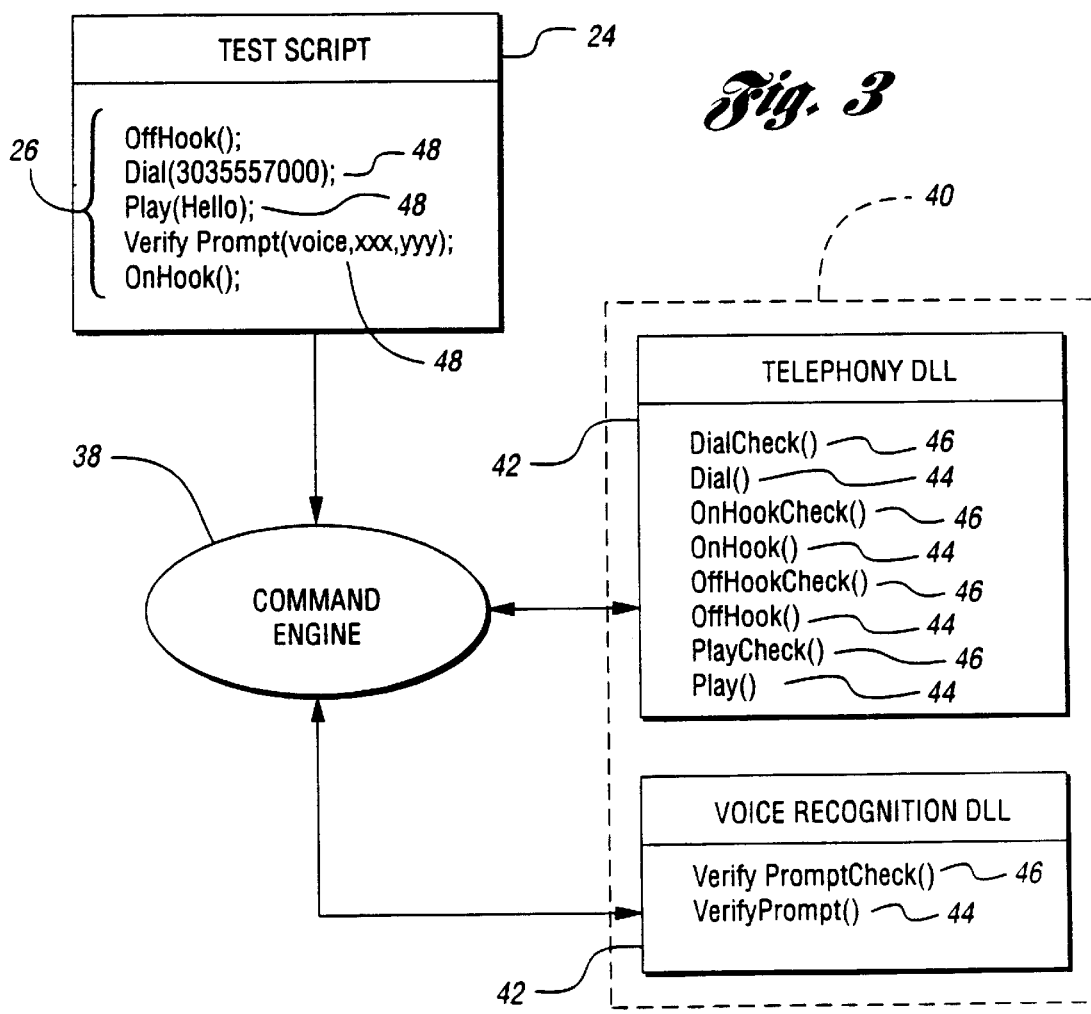
FIG. 3 shows various system components and example test script commands and associated DLL functions.

Voice and non-voice test signals are generated to VMS 18 by executing preexisting test scripts 24. Referring again to FIG. 2, processor 20 is in communication with at least one storage device for storing test scripts 24, as well as test parameters and test results. A test script 24 contains one or more test script commands 26, as shown in FIG. 3. The storage device may be in the form of memory 28 co-located with processor 20, or a database 30 in communication with processor 20. Preferably, testing system 16 includes a user interface 32, such as a monitor 34 and keyboard 36, from which an operator can direct the execution of test scripts 24 in order to control the interaction with VMS 18.

A command engine 38 is provided in communication with processor 20 and memory 28 and/or database 30 for reading the test script commands 26. Instead of implementing the execution logic of the test script commands 26 within command engine 38, these functions are implemented within a separate directory 40 in communication with processor 20. As shown in FIG. 2, directory 40 contains one or more service testing applications 42 associated with VMS 18 and developed as DLLs. Each service testing application is associated with and responsible for testing a different service component of VMS 18. In the example depicted in FIG. 2, landline telephony, wireless, mailbox, and voice recognition service testing applications are shown.

Using the above-described configuration, command engine 38 can advantageously call functions through dynamic linking that are not part of its executable code. Instead of residing in command engine 38, the executable code is located in one or more service testing application DLLs 42 containing one or more functions that are compiled, linked, and stored separately from the command engine 38 using them. Therefore, the functions of service testing applications 42 can be changed without recompiling command engine 38.

As shown in FIG. 3, service testing applications 42 preferably contain two types of functions associated with test script commands 26. First, service testing applications 42 contain executable functions 44, which are operable to execute the associated test script commands 26. For example, the test script command "Dial(3035557000)" is associated with the executable function "Dial( ) " found in the telephony DLL. Preferably, each service testing application 42 further includes syntax checking functions 46 associated with the test script commands 26. Continuing with the example, the syntax checking function "DialCheck( )" found in the telephony DLL is associated with the test script command "Dial." Syntax checking functions 46 are responsible for checking the syntax of test parameters 48 which are included as an argument for each test script command 26. Returning again to the example, the test parameter "3035557000" is included in the test script command "Dial." The process by which test parameters 48 are passed to the syntax checking functions 46 and eventually the executable functions 44 is described in greater detail below.

In operation, command engine 38 first reads a test script command 26 from test script 24. Command engine 38 is operable to scan all of the service testing applications 42 in directory 40 for the executable functions 44 and syntax checking functions 46 associated with the particular test script command 26. If these associated functions are found in one or more of the service testing applications 42, the functions 44 and 46 will handle the syntax checking and the execution of the test script command 26. If the associated syntax checking 46 and executable 44 functions cannot be found for the test script command 26, a fail condition will be returned to command engine 38.

If the associated functions for the particular test script command 26 are found in one or more of the service testing applications 42, then command engine 38 passes the test parameter 48 included in the test script command 26 to the syntax checking function 46. Upon checking the syntax of test parameter 48, syntax checking function 46 will return either a success or a fail condition to command engine 38. If a success condition is returned, command engine 38 will load the associated executable function 44 along with the approved test parameter 48 and execute the function 44 in order to interact with VMS 18.

Examples of the interaction with VMS 18 that can be accomplished by test scripts 24 include call control functions for establishing communication between testing system 16 and VMS 18, voice play and record functions for sending voice test signals from testing system 16 to VMS 18 and for recording voice response signals received from VMS 18, and speech recognition functions for recognizing the received voice response signals.

As a first example of the operation of testing system 16, consider the test script command "Dial(3035557000)." When command engine 38 reads "Dial(3035557000)" from test script 24, it will scan DLL directory 40 for the syntax checking function "DialCheck( )." In the example shown in FIG. 3, command engine 38 will find this function in the telephony DLL. It then passes the test parameter (3035557000) to the function "DialCheck( )" to check the syntax. If "DialCheck( )" returns a success, command engine 38 loads the executable function "Dial( )" along with the test parameter from the telephony DLL and executes the function. In this case, execution of the function will dial the telephone number (303) 555-7000, thereby establishing communication with VMS 18.

Referring again to FIG. 2, the testing method of the present invention preferably further includes detecting a response signal from VMS 18, typically in the form of a voice signal. The response signal can be recorded by telecommunication interface 22 and saved in memory 28 or database 30. In addition, the testing method of the present invention preferably includes evaluating the response signal to assess the operation of VMS 18. Voice recognition software (not shown) can be provided which is operable with processor 20, and is used to determine whether a detected response signal recorded from VMS 18 substantially corresponds to the response signal expected.

Turning to FIG. 3, the method steps of detecting a response signal and evaluating the response signal can also be accomplished through test script 24. For example, consider the case where it is desired to test the ability to leave a message in a voice mailbox of VMS 18. Upon establishing communication with VMS 18, the test script command "Play(Hello)" and the associated syntax checking and executable functions "PlayCheck( )" and "Play( )", respectively, from the telephony DLL can be used to generate the voice test signal "Hello" to VMS 18. Then, the test script command "VerifyPrompt(voice,xxx,yyy)" and the associated syntax checking and executable functions "VerifyPromptCheck( )" and "VerifyPrompt( )", respectively, from the Voice Recognition DLL can be used to detect a response signal from VMS 18 that corresponds to the message left by the "Play(Hello)" command. Using voice recognition software operable with processor 20, the detected response signal can be compared with an expected response signal to make sure that VMS 18 is working properly.

Many advantages can be realized from the testing system and method of the present invention. Most importantly, since all of the executable code resides in service testing applications 42, the command engine 38 need not be recompiled each time a change in testing functionality is implemented. This configuration reduces the time and cost of maintaining existing services, and improves the ease with which new services and functionality can be added. To add new test script commands 26, syntax checking and execution logic is simply added to an existing DLL or used to create a new DLL, and the DLL is copied to a directory accessible by command engine 38. Therefore, only the impacted DLL needs to be recompiled before the test modification can take effect.

In addition, the same command engine 38 can be used for different service testing applications 42. Since no changes must be made to the command engine 38 itself, a DLL can be added or modified to support a service that was not available when the testing system 16 was originally developed. Furthermore, the testing system and method of the present invention promote the ease with which different service testing applications can be sold to different clients. For example, a client who wants to have the functionality of wireless testing can purchase a wireless DLL only. If the client wishes at a later time add voice recognition testing functionality, a Voice Recognition DLL can be purchased and run with the same command engine 38.

Although VMS testing has been described and exemplified herein, the telecommunication system under test may be of any type. The testing system and method of the present invention are especially useful in a telephony-testing environment where common functionality is shared among different services.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. A method of testing a telecommunication system, comprising:

reading a test script command;

scanning a directory for an executable function associated with the test script command, wherein the executable function is contained within a service testing application associated with the telecommunication system and developed as a dynamic linked library (DLL); and executing the associated executable function in order to generate a test signal for receipt by the telecommunication system.

2. The method of claim 1, wherein the telecommunication system includes a voice messaging system (VMS).

3. The method of claim 1, further comprising scanning the directory for a syntax checking function.

4. The method of claim 3, further comprising passing a test parameter from the test script command to the syntax checking function.

5. The method of claim 1, further comprising detecting a response signal produced by the telecommunication system.

6. The method of claim 5, further comprising evaluating the response signal to assess the operation of the telecommunication system.

7. The method of claim 1, further comprising adding a test script command by adding at least one function to the service application.

8. The method of claim 1, wherein generating a test signal includes generating a DTMF signal.

9. The method of claim 1, wherein generating a test signal includes generating a voice signal.

10. A system for testing a telecommunication system, comprising:

a processor for controlling the execution of test script commands used to direct testing of the telecommunication system;

a storage device in communication with the processor for storing the test script commands;

a directory in communication with the processor, the directory having at least one service testing application associated with the telecommunication system and developed as a dynamic linked library (DLL), the at least one service testing application containing executable functions associated with the test script commands;

a command engine in communication with the processor, storage device, and directory for reading the test script commands, scanning the directory for the associated executable functions, and executing the associated executable functions; and a telecommunication interface in communication with the processor and the telecommunication system to generate test signals for receipt by the telecommunication system based on the test script commands and the associated executable functions.

11. The system of claim 10, wherein the telecommunication system includes a voice messaging system (VMS).

12. The system of claim 10, wherein the storage device is further operable to store test parameters for the test script commands.

13. The system of claim 12, wherein the at least one service testing application further includes syntax checking functions operable to check the syntax of the test parameters.

14. The system of claim 10, wherein the telecommunication interface is further operable to detect a response signal produced by the telecommunication system.

15. The system of claim 10, wherein the processor is further operable to evaluate the response signal.

16. The system of claim 10, wherein the test signals comprise DTMF signals.

17. The system of claim 10, wherein the test signals comprise voice signals.

* * * * *